April 4, 1961    F. N. D. KURIE ET AL    2,978,668
EXPENDABLE ECHO SOUNDER
Filed April 8, 1953    4 Sheets-Sheet 1

INVENTORS
F. N. D. KURIE
L. A. CARTWRIGHT

BY George Sipkin
George E. Pearson
ATTORNEYS

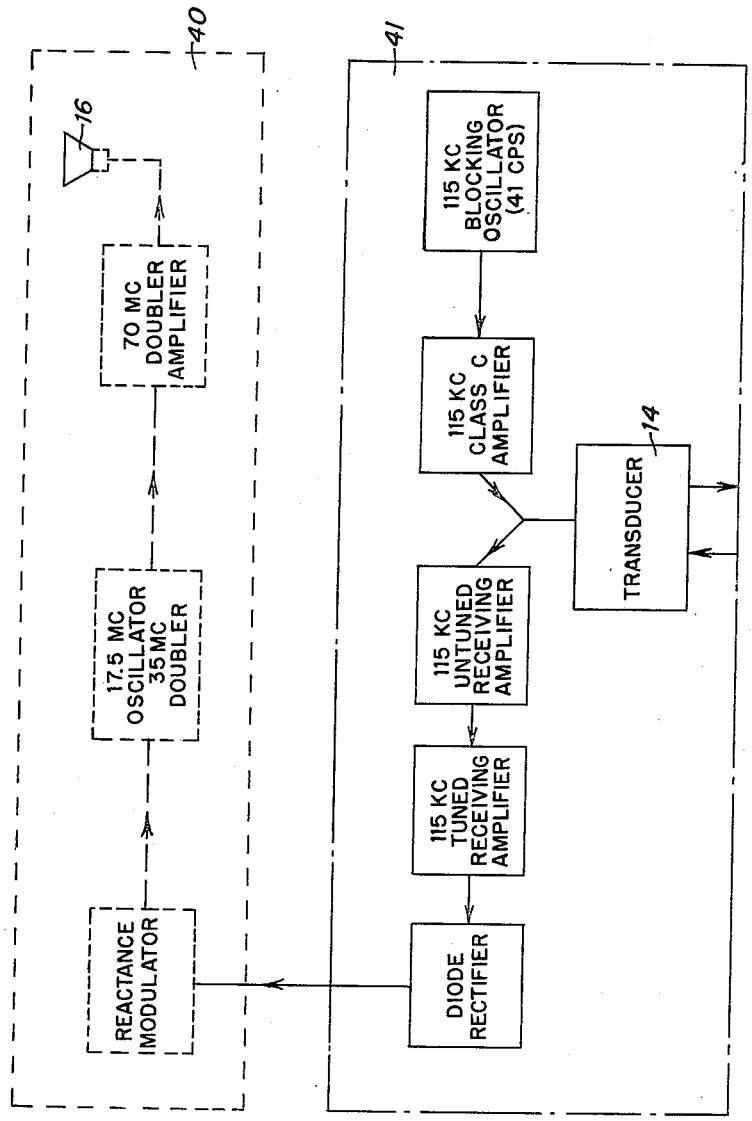

April 4, 1961  F. N. D. KURIE ET AL  2,978,668
EXPENDABLE ECHO SOUNDER
Filed April 8, 1953  4 Sheets-Sheet 3

INVENTORS
F. N. D. KURIE
L. A. CARTWRIGHT
BY
George Sipkin
George E. Pearson
ATTORNEYS

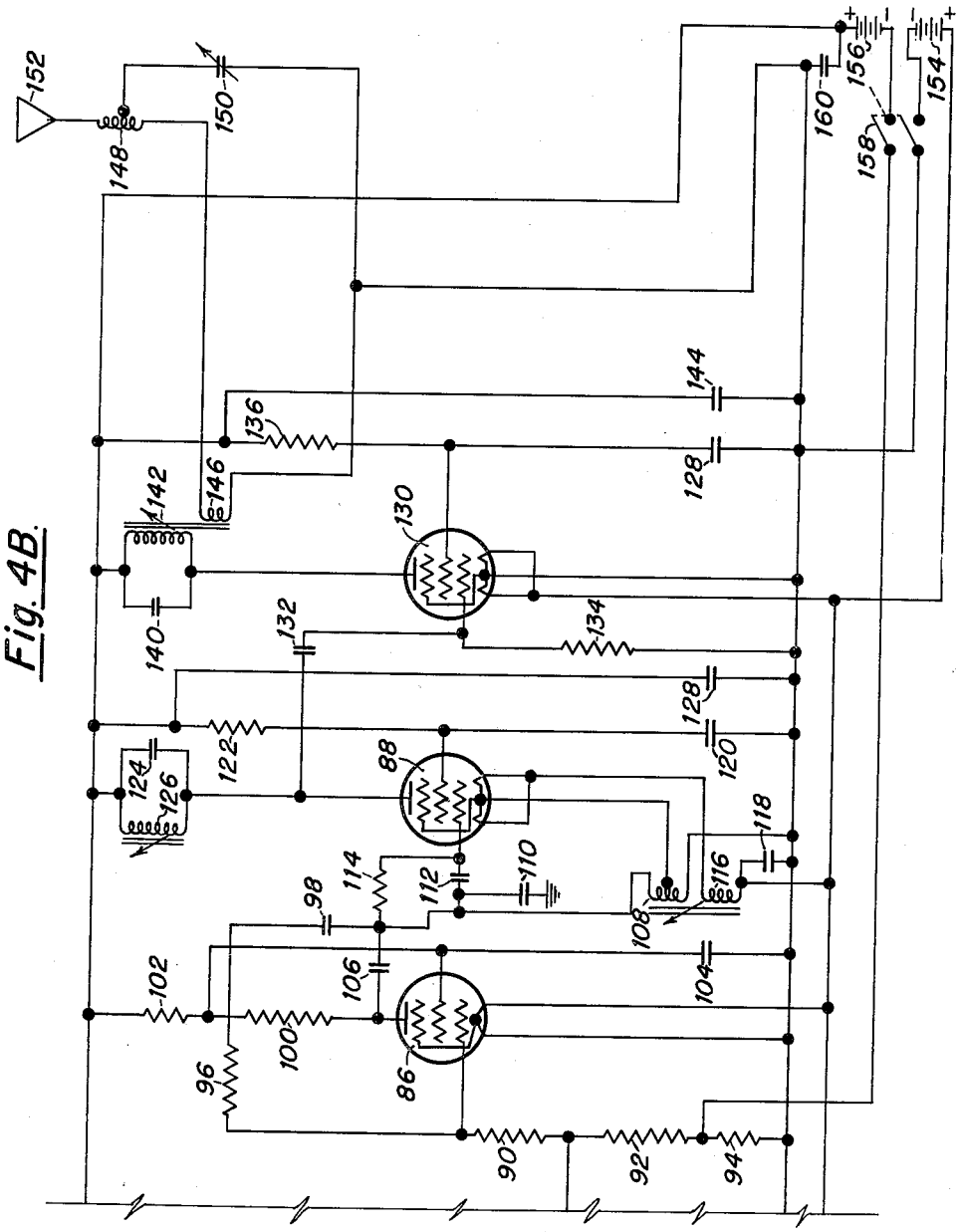

United States Patent Office 2,978,668
Patented Apr. 4, 1961

2,978,668
EXPENDABLE ECHO SOUNDER

Franz N. D. Kurie, Alexandria, Va., and Louis A. Cartwright, San Diego, Calif., assignors to the United States of America as represented by the Secretary of the Navy Filed Apr. 8, 1953, Ser. No. 347,633

1 Claim. (Cl. 340—2)

(Granted under Title 35, U.S. Code (1952), sec. 266)

The invention described herein may be manufactured and used by or for the Government of the United States of America for governmental purposes without the payment of any royalties thereon or therefor.

This invention relates to the exploration of inaccessible waters and more particularly to apparatus for continuously determining the depth of water at its position and transmitting the intelligence and an apparatus for interpreting the intelligence and indicating the depth of water.

Briefly stated, the invention includes a radio transmitter, sonic depth measuring apparatus and electric batteries all mounted in an elongated buoy adapted to float upright on the surface of the water. The buoy supports a radio antenna at its upper end and suspends an electromechanical transducer for sonic sounding from its bottom. It is adapted to be launched by a parachute from an airplane with all of its electronic equipment operating and with its antenna extended, but with the underwater transducer enclosed within the housing. The impact of hitting the water releases the transducer so that it hangs free and level a few inches below the bottom of the buoy. The electronic apparatus generates a ping signal by means of a blocking oscillator which signal is amplified and transmitted through the transducer into the water as a sonic signal which is reflected from the bottom as an echo signal. Both the original ping and echo signals are further amplified and utilized to modulate a radio-frequency signal which is transmitted and may be received by an observer who can determine the location of the buoy visually or otherwise. The radio signal received by the observer can be readily demodulated and the modulating signal may be interpreted to indicate the depth of water below the buoy by determining the time interval between the ping and echo signals visually by means of a cathode ray oscilloscope or otherwise.

One object of the present invention is the provision of apparatus for measuring the depth of water in inaccessible waters such as those of a hostile or unsafe shore which may be readily operated from an aircraft or other remote station.

Another object of the present invention is the provision of an improved apparatus for continuously measuring the depth of water and indicating the depth at a remote control station while the measuring means is moving with respect to the bottom of the body of water.

Other objects and many of the attendant advantages of this invention will be readily appreciated as the same becomes better understood by reference to the following detailed description when considered in connection with the accompanying drawings wherein:

Fig. 3 is a block diagram of a circuit for emitting and receiving the pulse signal transmitted through the water and the radio circuit for transmitting the intelligence; and Figs. 4a and 4b taken together constitute a schematic circuit diagram of the apparatus shown in Fig. 3.

Figure 1:
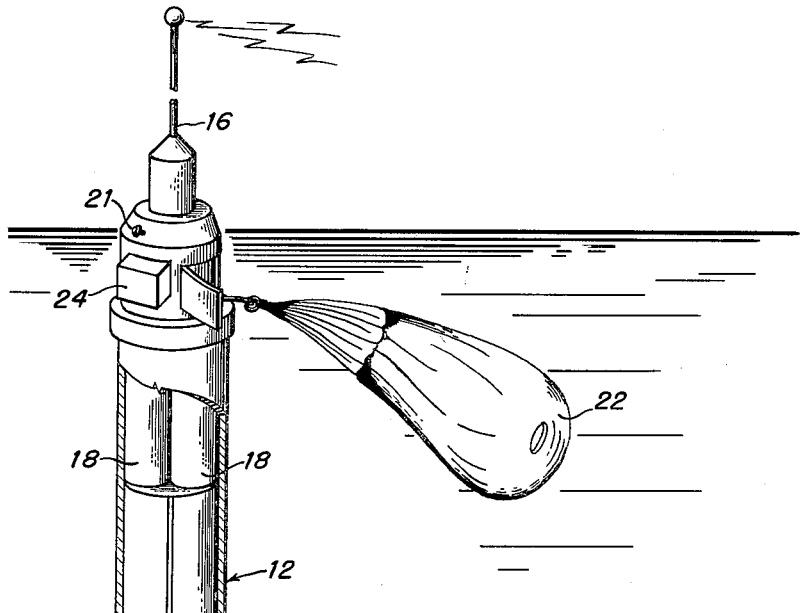
Fig. 1 illustrates one preferred embodiment of the present invention with a portion of the casing broken away to show the interior arrangement of components.
Figure 2:
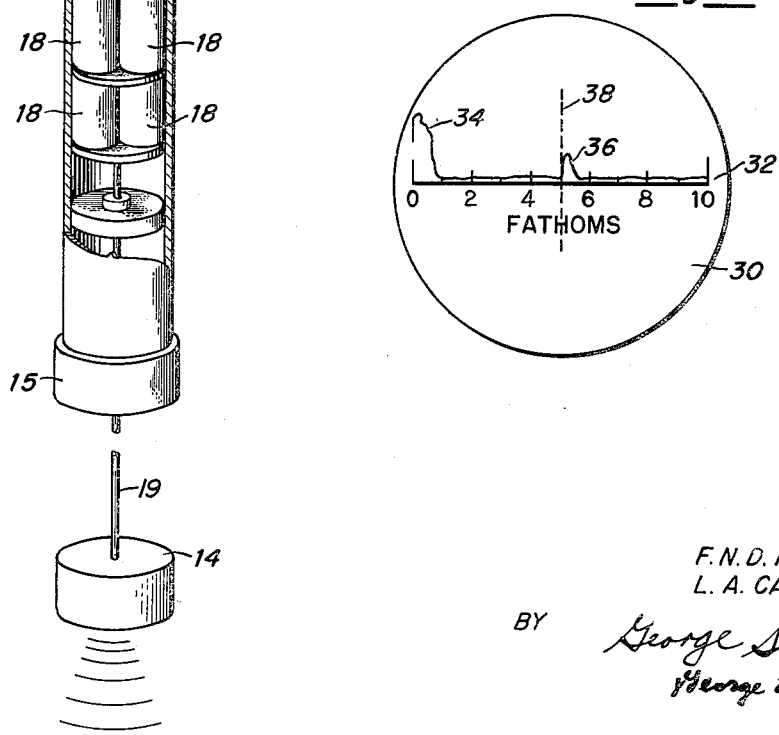
Fig. 2 illustrates the visual indication of the ping and echo signals as shown on a cathode ray oscilloscope connected to the receiver.

Referring now to the drawings in detail, the device of the present invention as shown in Fig. 1, includes a buoyant body 12, an electromechanical transducer 14 suspended from the body 12 by an electrical cable 19 and a radio antenna 16 supported on it above the surface of the water. Housed within the body 12 are electric batteries 18 and electronic apparatus 20. A release mechanism 21 actuating a switch (not shown) permits the device to be turned on before it is launched from an airplane or other craft. A parachute 22 serves to slow the speed of the descent, if the device is dropped from an airplane, and also drags in the water and serves to some extent as a sea buoy for stabilizing the device while floating in the water. A bag of dye 24 may be tied to the buoy and stains the water surrounding it to facilitate visual observation of the position. The transducer 14 is housed within the lower end 15 of the body 12 until the device enters the water and is adapted to be released by impact with the water. With this arrangement the transducer 14 will hang substantially level in spite of the bobbing and rolling of the body 12 caused by the wind and waves.

The electronic apparatus 20, in a manner to be described in detail infra, generates an electrical pulse or ping of short duration such as $\frac{1}{10}$ of a millisecond at a pulse rate such as 41 pings per second. The transducer 14 converts the electrical pulses into supersonic energy in the water and also receives the energy from the echo pulse reflected from the bottom and converts it into electrical impulses.

Both electrical impulses from the initial ping and the echo are amplified and the voltage wave is preferably impressed on the modulator of a frequency modulating type of transmitter which sends out the electromagnetic radio signal from antenna 16.

Radio signals broadcast by the buoy 10 are picked up by an ordinary radio receiver aboard the airplane or at any other remote control station, where the signals may be displayed and interpreted on the screen 30 of a cathode ray oscilloscope (not shown). The screen 30 is preferably provided with a scale 32 suitably marked off in fathoms or other convenient units of length.

Since the speed of sound in water is known, the depth of the water can be determined from the length of time between a ping and its echo. The interval of 25 milliseconds between pings is the time required for sound to travel 60 ft. (10 fathoms) to the bottom and 60 ft. back to transducer 14. Accordingly using an interval of 25 milliseconds in water of less than 10 fathoms, the echo pulse will occur after its own ping but before the next ping. If the water is more than 10 fathoms, the echo will arrive after the next ping. Thus the same spacing of ping and echo may mean 5, 15 or 25 fathoms. These ambiguities are common to sonic echo operations and are resolved by other observations. Thus, in one application of the device of the present invention, only measurements up to 5 fathoms were wanted, and aerial observers were able to distinguish between 5 fathoms and 15. If desired, the pinging rate may be varied, so that the time interval is longer and will correspond to a greater depth, thus decreasing the possibility of ambiguity but also decreasing the accuracy of the measurement.

The image on screen 30 is adjusted so that the beginning of the initial ping 34 is on the zero of the scale and the beginning of the following ping (not shown) comes at the 10 mark of the scale illustrated. The echo ping 36 will fall somewhere on the scale and its beginning or initial point indicated by the dotted line 38 will indicate the depth of the water in fathoms.

The functional units of the electronic equipment 20 are indicated in Fig. 3. The frequency modulated radio transmitter 40 consists of a reactance modulator, a 17.5 mc. oscillator, a 35 mc. doubler and a 70 mc. doubler amplifier which is connected to the antenna 16 by a suitable coupling circuit. The supersonic system 41 of the sounding device consists of a 115 kilocycle blocking oscillator pulsing at 41 cycles per second, a 115 kc. class C amplifier, a transducer 14, a 115 kc. untuned receiving amplifier, a 115 kc. tuned amplifier and the diode rectifier connected to the reactance modulator of the FM transmitter 40.

Figure 4A:
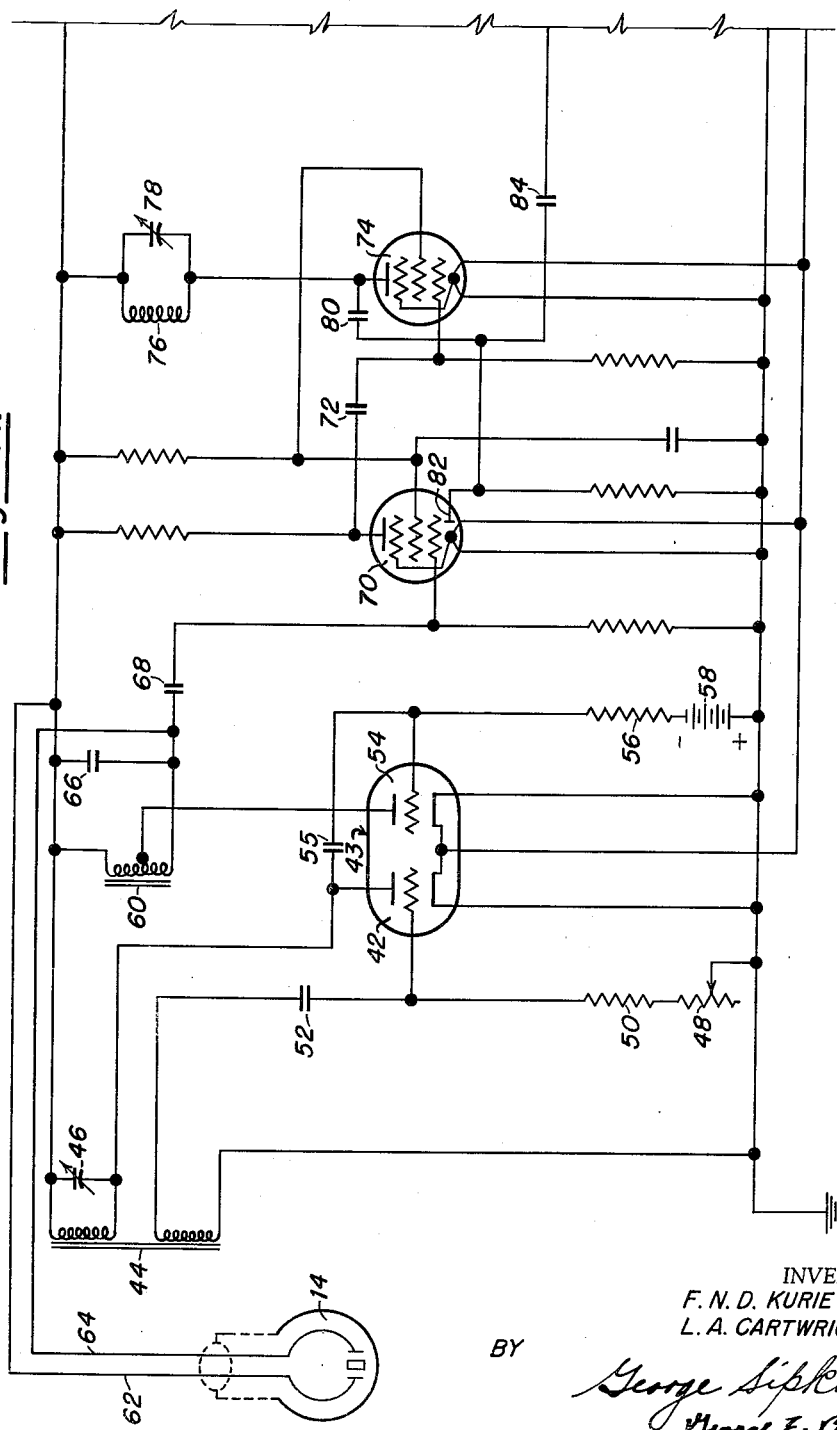

Referring now to the circuit diagram of Figs. 4a and 4b, the self-blocking oscillator utilizes one section 42 of the duo-triode tube 43 and forms the ping generator operating at a suitable supersonic frequency such as 115 kc. This section generates pings of very short duration in the order of 1/10 of a millisecond and which may be at any desired rate such as 41 pings per second depending on the depth of water to be measured. The transformer 44 provides feedback from the plate circuit to the grid circuit of the oscillator section 42 of tube 43 and a variable condenser 46 is provided for tuning the plate circuit to the desired frequency such as 115 kc. per second. The potentiometer 48 in series with resistance 50 together with condenser 52 form an RC circuit in which variation of the potentiometer 48 controls the ping rate. The right hand triode section 54 of tube 43 constitutes a class C amplifier coupled to the plate of the oscillator triode section 42 through a coupling condenser 55. The grid of section 54 is connected through resistor 56 to the negative side of battery 58 to establish grid bias. The periodic pulses are applied through an auto-transformer 60 and leads 62 and 64 to the transducer 14, where they are transmitted as sound waves into the water. These sound pulses are returned as echoes off the bottom and excite the transducer 66 mechanically to generate an echo pulse which is returned through the leads 62 and 64. A fixed condenser 66 is utilized to tune the plate circuit of amplifier section 54. Both the original pulse and the echo pulse are applied through a coupling condenser 68 to the control grid of tube 70, where the signal is amplified and applied through a coupling condenser 72 to the control grid of tube 74. The signal is amplified further in tube 74 with the resonant circuit consisting of inductance coil 76 and a variable trimming condenser 78 maintaining the desired frequency. The signal from the plate circuit of the tube 74 is applied through coupling condenser 80 and is rectified in the diode section of tube 70 by means of anode 82. The rectified signal is then applied through coupling condenser 84 to the grid of modulator tube 86 in Fig. 4b.

The reactance tube 86 functions as a variable reactance connected in parallel across the tuned circuit of the radio-frequency oscillator tube 88. A portion of the R.–F. oscillator voltage is fed back to the grid of the reactance tube through a phase shifting network which shifts this voltage 90° in phase with respect to the voltage across the oscillator tank. The voltage applied to the grid of the reactance tube causes plate current to flow, which is in phase with the grid voltage and 90° out of phase with the R.-F. voltage across the oscillator tank. For this reason, the voltage developed across the plate-load resistor is 90° out of phase with the R.-F. oscillator tank voltage, and the reactance-tube circuit thus acts as a reactance shunted across the tank circuit of the oscillator. The magnitude of this reactance with no audio-signal voltage applied to the grid is determined by the grid bias of the reactance stage. This reactance value, in combination with the reactance elements of the oscillator tank circuit, determines the mean oscillator frequency. When the audio signal is applied to the grid of the reactance tube, it, in effect, varies the bias and the apparent reactance at an audio-frequency rate. This in turn, causes the oscillator frequency to vary about its mean frequency at the audio-frequency rate.

The amount by which the oscillator shifts from mean frequency is called the frequency deviation. The frequency deviation is determined by the amplitude of the audio voltage. To secure the best reception, a frequency deviation of approximately 75 mc. on either side of the mean transmitter frequency is necessary. For this reason this value, ±75 mc., has been arbitrarily chosen as the standard to represent 100% modulation. In FM the term "100% modulation" differs entirely from the meaning associated with it in amplitude-modulated transmitters. For AM, 100% modulation refers to the greatest degree of modulation that can be applied to a carrier wave without resulting in distortion. In frequency modulation, 100% modulation corresponds to the frequency deviation for the loudest signals to be transmitted. This is determined by the design of the equipment and is not limited by distortion as in amplitude modulation.

The frequency deviation of the present oscillator produced by the reactance modulator for 100% modulation is preferably ±18.75 megacycles from the mean oscillator frequency. Since the oscillator frequency is doubled twice in the following stages, the final frequency deviation of the transmitted R.-F. signal is ±75 megacycles, i.e., ±18.75 mc.×2×2=±75 mc.

The input circuit of the reactance modulator 86 is made up of resistors 90 and 92 together with coupling capacitor 84. Capacitor 84 couples the signal voltage to the grid circuit. Resistance 90 acts as an isolating resistor and with the resistance 92 forms a grid leak resistor. Resistance 94 is a bias resistor for the reactance tube. The bias voltage is developed across this resistor by the flow of the plate current from all the tubes in the transmitter through resistance 94. This voltage is of sufficient magnitude to bias the reactance tube 86 to the desired operating point. Resistor 96, capacitor 98 and the grid-to-cathode capacity of tube 86 form the phase shifting network between the tank circuit and the grid of the reactance tube 86. A portion of the R-F oscillator tank voltage is shifted 90° in phase and applied to the grid of the reactance tube 86 through this circuit. Resistance 100 is a plate load resistor for tube 86 and resistor 102 is the de-coupling resistor in the plate voltage lead. Capacitor 104 is the by-pass condenser for the screen grid. Capacitor 106 is the coupling capacitor between the plate circuit of the reactance tube 86 and the tuned circuit for the oscillator which consists of an inductance coil 108 and a condenser 110.

The control portion of the oscillator is a conventional Hartley circuit utilizing the pentode tube 88 as the oscillator tube and also as one stage of amplification. The screen grid, control grid, and filament of tube 88 are used in the actual oscillator control circuit and the signal is amplified in the plate circuit. The radio frequency energy from this control circuit is coupled to the plate output circuit by means of the cathode plate current electronic stream. By using an electronic coupling the control section of the oscillator is electrically isolated from the load portion of the circuit. This results in a greater degree of frequency stability under varying load conditions.

The tuned circuit of the oscillator control section consists of inductor coil 108 and capacitor 110. The resonant frequency of this type of circuit is preferably approximately 17.5 megacycles for the reasons stated supra. The tuned circuit has a high Q and capacitor 110 preferably has a negative temperature coefficient. These factors provide good frequency stability at this high radio frequency. The operating frequency of the control section is adjusted by varying the inductance of coil 108 by means of the movable polyiron core of the inductor. The bias of the oscillator is determined by the values of capacitor 112 and resistor 114.

The two halves of the filament of the oscillator tube 88 are connected in parallel. The filament must be maintained at R-F potential above ground for the circuit to function properly. When both sides of the filament are maintained at the same R-F potential, maximum power output is obtained from the oscillator. To assure that the positive and negative ends of the filament halves will be at the same R-F potential, a four-turn coil 116 is connected to the positive A-battery lead and by-passed to ground by condenser 118. The other end of the coil is connected to one terminal of the parallel filament sections. The induced R-F voltage in this extra winding is thus applied to the positive terminal of both halves of the filament. The center tap or other end of each half of the filament is connected to a tap on coil 108, four turns up from the ground end. From this tap on coil 108 an R-F voltage equal to and of the same polarity with respect to ground as the voltage in the extra coil, is applied to the negative terminal of the filament. These voltages being equal and of the same polarity result in the entire filament being maintained at a constant R-F potential above ground.

Capacitor 120 is the R-F by-pass condenser for the screen grid of tube 88 and resistor 122 is the screen dropping resistor. The output circuit of tube 88 is composed of the fixed capacitor 124 and the variable inductance coil 126 constituting a tank circuit the frequency of which is tuned to the second harmonic of the oscillator control section which would preferably be approximately 35 megacycles. Tuning is accomplished by varying the inductance of coil 126 by means of a movable polyiron core. Capacitor 128 is an R-F by-pass condenser for the plate high-voltage lead.

A pentode vacuum tube 130 serves as the radio frequency power amplifier and frequency doubler. The output of the electron-coupled oscillator-doubler is coupled to the grid of tube 130 by a capacitor 132. Resistor 134 is the grid bias resistor for tube 130. The screen grid dropping resistor 136 and the screen R-F by-pass condenser 138 perform their normal functions.

The output plate circuit of tube 130 is the tuned tank consisting of the fixed capacitor 140 and the variable inductor 142. Capacitor 140 is preferably a silver-mica capacitor with a negative temperature coefficient and coil 142 is a variable inductor tuned by a movable polyiron core. This resonant circuit is tuned to twice the input frequency and will preferably be approximately 70 megacycles. Since the input circuit and output circuits operate on such widely different frequencies, there is no need for neutralization. Capacitor 144 is an R-F by-pass condenser used to keep the B+ lead of coil 142 at R-F ground potential.

The antenna coupling coil 146 is wound as a second winding on coil 142. In conjunction with the antenna loading coil 148 and the variable capacitor 150 it serves to couple the output of the R-F doubler amplifier to the antenna 152. Tuning is accomplished by varying the capacity of condenser 150 until the coupled circuit is in resonance at the transmitter frequency.

Batteries are almost necessarily used to supply all of the required electrical power and should be sufficient to operate the radio transmitter, audio amplifier and hydrophone circuits for a substantial length of time depending on the particular use of the device. The A-battery power supply 154 preferably consists of a plurality of dry cells connected in parallel to supply the voltage for the filament circuits and will ordinarily supply a filament voltage of approximately 1½ volts.

The B-battery power supply 156 preferably consists of two or more high voltage miniature B-batteries connected in series to supply the voltage for the plate and screen grid circuits of the transmitter, audio amplifier and hydrophone circuit. The total output voltage of power supply 156 normally is approximately 135 volts.

The power is turned on and off by a double-pole single-throw spring-actuated switch 158 which is released for closing the circuit when the buoy is launched from the plane or other station, by the release mechanism 21 not disclosed in detail in the present application. Capacitor 160 is a by-pass condenser for radio frequencies from the B+ side of power supply 156 to ground.

While the present apparatus may be somewhat ambiguous in its indication on the cathode ray oscilloscope screen 30, when the buoy is dropped in water deeper than its maximum scale range, this difficulty can usually be overcome by making visual or other observations in the area to indicate whether the depth of water is greater than the maximum scale range. However, this device has inherent advantages, since it will send out a continuous signal which is at any time indicative of the depth of water below the buoy so that the apparatus may be used in surveying a submerged area and on reconnaissance in war time in or adjacent enemy territory. It may for these purposes be allowed to drift with wind and currents across the area or may be towed behind a small boat or by a swimmer over any water area within its range and it will provide a continuous profile sounding of the bottom below the buoy. It may thus be used to locate reefs, ledges and other under-water obstacles which knowledge is extremely important in amphibious warfare and underwater demolition.

Obviously many modifications and variations of the present invention are possible in the light of the above teachings. It is therefore to be understood that within the scope of the appended claim the invention may be practiced otherwise than as specifically described.

What is claimed is:

An apparatus for continuous profile sounding of the bottom below a floating buoy free to be airborne to the point of sounding and then dropped to the water surface, said buoy being free to drift with the water currents, an electromechanical transducer, a housing at the lower end of said buoy, means for securely holding said transducer within said housing prior to impact with the water and releasing the transducer upon said impact, said transducer being electrically connected to the buoy by a flexible cable, said flexible cable providing the physical support for said transducer and suspending the same in a horizontal position below the buoy whereby the transducer transmitted pulse will be directed vertically toward the bottom regardless of the bobbing and rolling of the buoy by wind or waves, electronic means housed in said buoy for automatically generating and amplifying electrical pulses of short duration, said transducer being adapted to convert said electrical pulses into supersonic energy and positioned for vertically pinging the bottom below said transducer and receiving the echo pulse therefrom, said electronic means includes means for generating a radio frequency signal and modulating said signal with the transducer transmitted pulse and echo signal and transmitting the intelligence by short wave radio, means remote from said buoy for receiving said radio waves and indicating the depth of the water below said buoy.

References Cited in the file of this patent
UNITED STATES PATENTS

| | | |
|---|---|---|
| 2,361,177 | Chilowsky | Oct. 24, 1944 |
| 2,502,938 | Fryklund et al. | Apr. 4, 1950 |
| 2,567,229 | Morse | Sept. 11, 1951 |
| 2,629,083 | Mason et al. | Feb. 17, 1953 |
| 2,758,203 | Harris | Aug. 7, 1956 |

OTHER REFERENCES

"Telemetering Fathometer," by E. F. Kiernan, "Electronics" magazine, October 1947, pp. 96–98.